(12) United States Patent
Kim et al.

(10) Patent No.: US 6,559,989 B1
(45) Date of Patent: May 6, 2003

(54) OPTICAL PACKET HEADER PROCESSING APPARATUS FOR OPTICAL PACKET SWITCH

(75) Inventors: Kwang Joon Kim, Taejon (KR); Ji Wook Youn, Taejon (KR); Hee Sang Chung, Taejon (KR); Sung Un Lee, Taejon (KR); Jong Hyun Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/499,934

(22) Filed: Feb. 8, 2000

(30) Foreign Application Priority Data

Dec. 3, 1999 (KR) .............................. 99-54899

(51) Int. Cl.[7] ................................. H04J 14/08
(52) U.S. Cl. ................... 359/139; 359/135; 359/108; 370/392
(58) Field of Search ................. 359/117, 123, 359/128, 135, 139, 108; 370/392

(56) References Cited

U.S. PATENT DOCUMENTS

| | | | |
|---|---|---|---|
| 5,450,507 A | | 9/1995 | Shin et al. .................... 385/24 |
| 5,831,752 A | * | 11/1998 | Cotter et al. ................. 359/135 |
| 5,900,957 A | * | 5/1999 | Van Der Tol ................ 359/139 |

OTHER PUBLICATIONS

Glesk, I. et al., "All–optical address recognition and self–routing in a 250 Gbit/s Packet–Switched Network," *Electronics Letters*, 30(16): 1322–1333, Aug. 4, 1994.

* cited by examiner

*Primary Examiner*—Kinfe-Michael Negash
(74) *Attorney, Agent, or Firm*—SEED IP Law Group PLLC (57) ABSTRACT

An optical packet header processing apparatus for processing a header of an optical packet expressing an address of a destination node to control a switching operation of an optical packet switch. The optical packet header processing apparatus comprises a beam splitter for splitting the optical packet header into a predetermined number of optical packet header elements, and a plurality of time interval detectors. Each of the time interval detectors receives a corresponding one of the optical packet header elements from the beam splitter and outputs a detect optical pulse if a pair of optical pulses having a predetermined time interval therebetween are present in the received optical packet header element. A plurality of optical pulse detectors are adapted to convert the detect optical pulses from the time interval detectors into electrical signals and transfer the converted electrical signals to the optical packet switch, respectively. Therefore, the optical packet switch determines the destination node in response to the electrical signals from the optical pulse detectors and outputs the optical packet to an output port corresponding to the determined destination node.

9 Claims, 6 Drawing Sheets

OPTICAL PACKET HEADER PROCESSING APPARATUS FOR OPTICAL PACKET SWITCH

TECHNICAL FIELD

The present invention relates in general to an optical packet header, and more particularly to an apparatus for processing an optical packet header in an optical manner in an optical communication switching field.

BACKGROUND OF THE INVENTION

Communication techniques may generally be classified into a transmission field and a switching field. Up to the present, the transmission field has made startling progress on the basis of the developments of a wavelength division multiple accessing (WDMA) technique and an electrical time division multiplexing (ETDM) technique to meet a rapid increase in demand for communication resulting from the influence of the Internet. With the developments of various optical techniques based on the advent of fiber optics, the transmission field has made another technical development that can advance an optical signal from an ingress node to an egress node with no optical/electric conversion.

The transmission field has been developed centering around an optical signal according to the spread of fiber-optic techniques as mentioned above, but the switching field is not so. In other words, the switching field has still employed such a conventional technique that converts an optical signal into an electrical signal to be switched and reconverts the switched electrical signal into the optical signal, resulting in a bottleneck degrading the overall communication rate.

Hence, an optical transparency must be secured in the switching field so that an electrical signal can be converted into an optical signal and the converted optical signal can be switched directly with no optical/electric conversion. On the other hand, the optical transparency can be secured on the basis of an optical packet switching technology, which has been studied in various ways for practical use. An optical packet header processing technique is one of several problems to be solved for the implementation of the optical packet switching technology.

However, although a variety of optical packet header processing techniques have been proposed up to now, they have not been put to practical use because they involve many problems in spite of their respective advantages.

Conventional optical switching techniques will hereinafter be described briefly.

Figure 1:
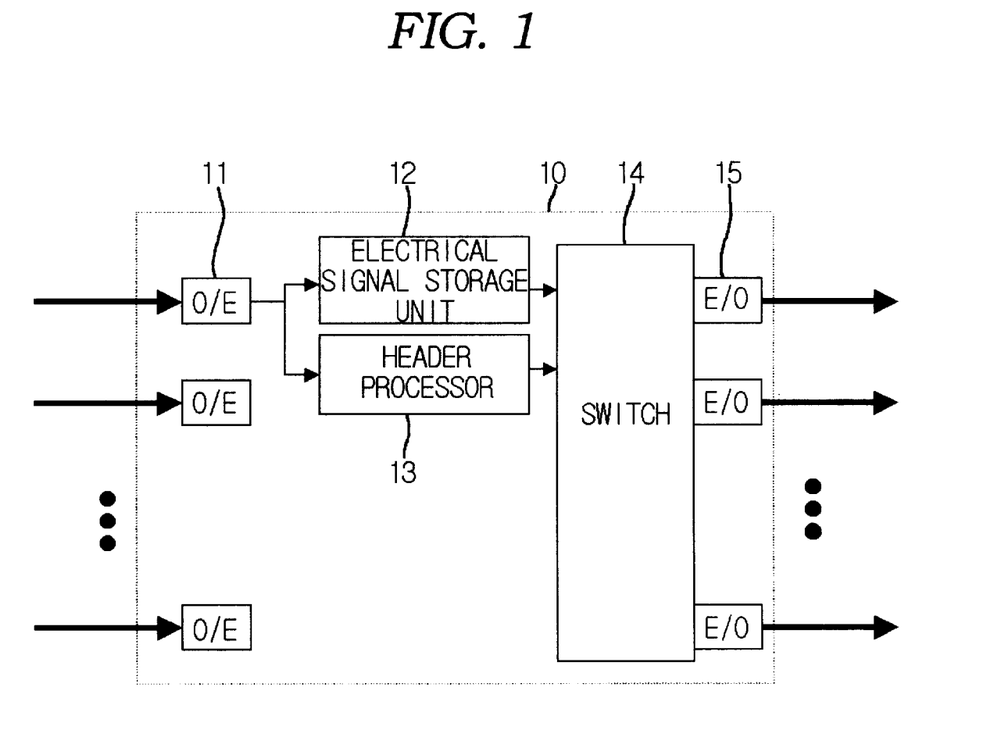
FIG. 1 is a view illustrating the concept of a conventional electronic optical switch.

FIG. 1 shows the construction of a conventional optical switch 10, which is operated in response to an electrical signal. Optical signals are inputted to respective input ports and then converted into electrical signals by respective optical/electric converters 11. Each of the electrical signals is stored in a packet unit into an electrical signal storage unit 12 in an appropriate manner. A head processor 13 decodes information in a header of each packet in an electric/electronic manner. A switch 14 analyzes a path of each packet using the header information and determines an output port of each packet in accordance with the analyzed result. Upon determining the output port, the switch 14 switches the corresponding packet to an output memory stack associated with the determined output port. Each output memory stack is implemented in a first in first out (FIFO) manner. As a result, each output memory stack outputs an earlier input signal, which is then converted into an optical signal by an associated electric/optical (E/O) converter 15.

Figure 2:
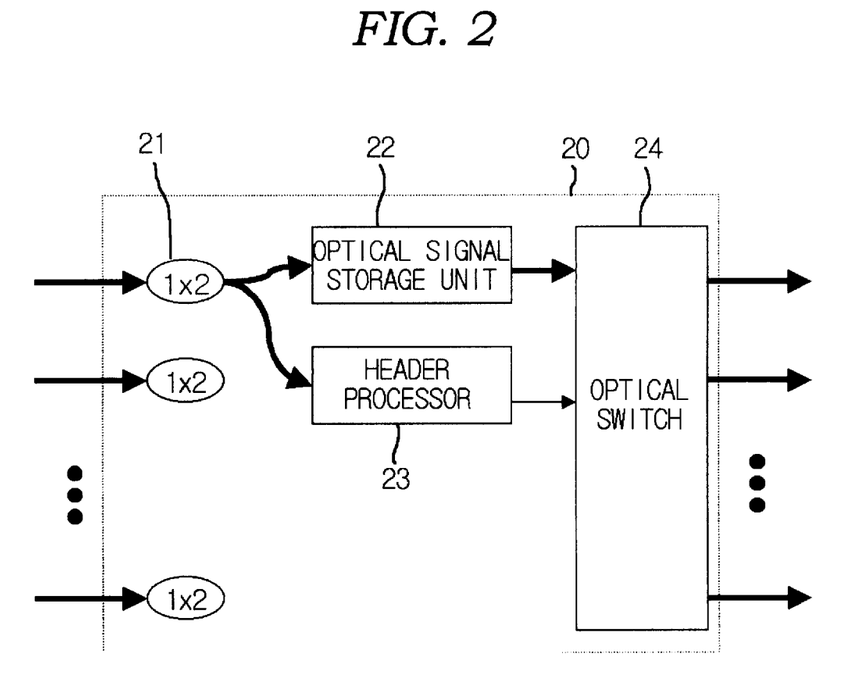
FIG. 2 is a view illustrating the concept of a conventional optical packet switch.

FIG. 2 is a view illustrating the concept of a conventional optical packet switch 20. Each optical signal is inputted to an input port and then optically split into two optical signals by a beam splitter 21. The split optical signals are stored into an optical signal storage unit 22 and further transferred to a header processor 23, which decodes information in a header of each packet. Upon determining an output port of an optical packet as a result of the analysis, the header processor 23 operates an optical switch 24 to output the optical packet through the determined output port. At this time, the output optical packet is continuously maintained in an optical signal form through the entire construction of the optical packet switch 20 without being subjected to either optical/electric conversion or electric/optical conversion.

In such an optical packet switching field, the header processing is one of important technical elements and has been proposed in various manners. In FIG. 2, the header processor 23 is compelled to perform optical/electric conversion because the optical switch 24 processes an optical signal under an electrical control.

Such optical header processing techniques may greatly be classified into two methods, or the former performing optical/electric conversion and electrically processing the resultant signal and the latter optically processing a given signal and performing the optical/electric conversion with respect to the resultant signal. These methods have their respective merits and demerits, but such a common feature that they should store an optical packet in the form of an optical signal while processing its header. An optical path with a predetermined length, based on the uniformity in light velocity, is used for the storage of the optical signal, and the optical header must be processed rapidly within a given time.

An approach to the former method, or the optical header processing method which first performs the optical/electric conversion and then the electrical process, has been proposed by KEOPS [see: Guillemot, C., et al., "Transparent Optical Packet Switching: The European ACTS KEOPS Project Approach", IEEE J. Lightwave Technology, vol. 16, No. 12, December 1998]. The overall length of an optical packet is 1646 nsec, which corresponds to 128 bytes at 622 Mbps. In the optical packet, a payload has a length of 1350 nsec and a header has a length of 14 bytes. The payload is subjected in rate to no particular restriction from several hundred Mbps up to 10 Gbps, but the header is fixed in rate to 155 Mbps. A synchronization pattern is appended to a head of the header for the processing of the header. A transmitted optical packet is optically radiated by a 1×2 coupler and then subjected to optical/electric conversion. Subsequently, a clock is recovered from a header of the optical packet according to a synchronization pattern of the header and the contents of the header are decoded synchronously with the recovered clock. An address and other information can be written in the header as in a typical electrical method and thus be electrically restored. As a result, a sufficiently large amount of information can be secured, thereby enabling the general optical switch to be operated as shown in FIG. 2.

On the other hand, there have been proposed various methods of processing optical packet headers in an optical manner, as will hereinafter be mentioned. One method is a keyword method [see: Cotter, D., et al., "Self-routing of 100

Figure 3:
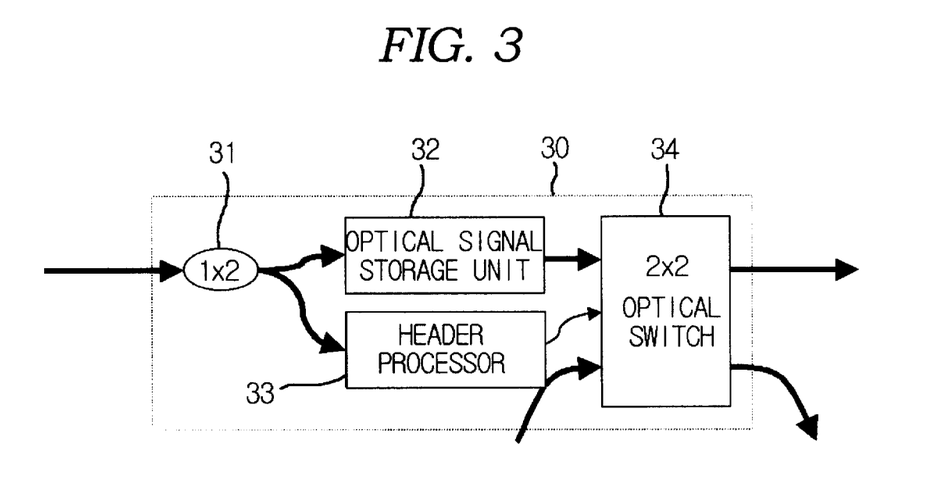
FIG. 3 is a view illustrating the concept of a conventional optical switch with the simplest structure.

Gbps packets using 6 bit 'keyword' address recognition", IEEE Electronics Letters, vol. 31, No. 25, Dec. 7, 1995]. Each node in this keyword method is an add-drop node 30 as shown in FIG. 3. An n-bit header is created on the basis of n/2-n codes. A unique address is assigned to each node, which comprises a 2×2 optical switch 34 for decoding a header of each input packet and determining whether to pass or drop each packet.

A header processor 33 acts to perform the header decoding operation, and an optical AND operation is used for the header decoding of the header processor 33. Namely, if one optical packet arrives at a specific node, then this node optically produces a complement address to a self address synchronized with a header of the optical packet. Thereafter, the specific node performs an optical AND operation for the optical packet header and the produced complement address, sequentially one bit by one bit.

At this time, provided that the header of the arrived optical packet has the same destination address as the self address of the specific node, the header address and the complement address of the node will have respective bit values opposite to each other. In this case, the optical AND operation results become 0 for all n bits contained in the header. As a result, the optical switch 34 in the node is crossed to drop the optical packet on the node.

However, unless the self address of the node and the address of the optical packet header are the same, the optical packet header and the complement address of the node will have at least one equal bit value. In this case, the optical AND operation result becomes 1. When at least one operation result is 1, the optical switch 34 is bar-shaped to pass the optical packet through the node.

Figure 4:
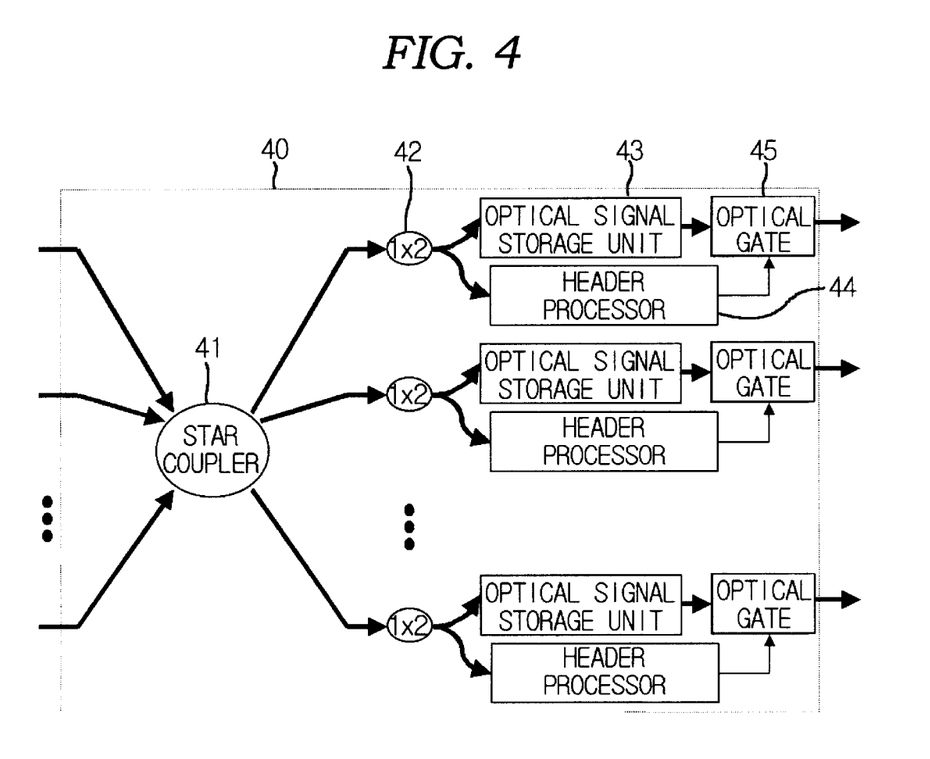
FIG. 4 is a view illustrating the concept of a conventional optical switch with a plurality of input ports and a plurality of output ports, based on the construction of FIG. 3.

FIG. 4 shows a method using an optical gate 45 instead of the optical switch 34 in FIG. 3. In a similar manner to that of FIG. 3, the method of FIG. 4 is adapted to perform the optical AND operation for the optical packet header and the node complement address and open the optical gate 45 only when the optical packet header and the node address are the same.

The above-mentioned keyword method is disadvantageous in that each add-drop node must produce a complement address to a self address whenever inputting an optical packet and perform an optical AND operation in accurate synchronization with a header of the input optical packet.

Another approach to processing the optical packet header in the optical manner is a method based on an optical code division multiple access (CDMA) technique, which is disclosed in U.S. Pat. No. 545,057, titled "Fiber-optic address detector in photonic packet switching device and method for fabricating the same", issued to Jong-dug Shin on Sep. 12, 1995, and shown in FIG. 5, herein.

Figure 5:
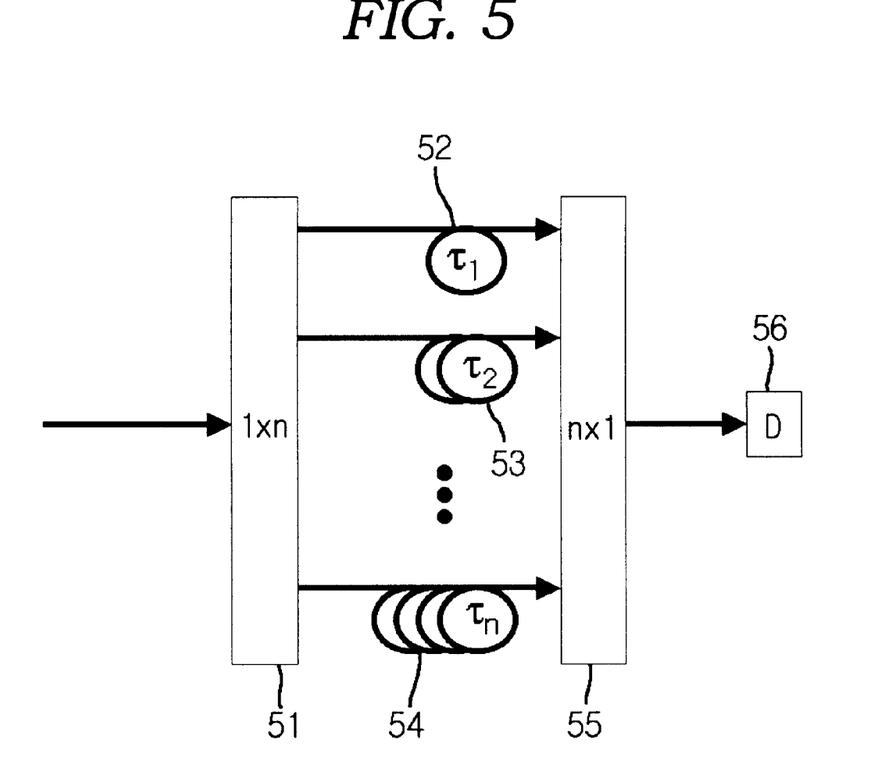
FIG. 5 is a view illustrating the concept of a conventional optical packet header processing apparatus based on an optical CDMA technique.

In the above optical CDMA technique, as shown in FIG. 5, a 1×N beam splitter 51 splits one optical pulse into N optical pulses. These N optical pulses are transferred along paths with different lengths to an N×1 coupler 55, which then couples the optical pulses into one optical pulse. As a result, one optical pulse can be transformed into a set of optical pulses having predetermined time intervals. An optical fiber delay line matched filter 56 is used to produce a combination of n optical pulses from one optical pulse. At this time, each delay line has a length set to an integer multiple of a minimum time unit. That is, if the entire length of a header is N (N>n), then n optical pulses are arranged in the header in such a way as $A=(N-1)!((n-1)!/(N-n)!)$.

Even in this method, a unique address is assigned to each node, and the optical fiber delay line matched filter is also used for the header decoding. Each address is determined according to the arrangement of delay line lengths. If an optical packet header is passed through the optical fiber delay line matched filter of each node, then the maximum (2N−1) optical pulses with different light intensities are newly produced on the basis of their rearrangement along delay lines. If one optical pulse forming an optical packet header has a light intensity of I after being twice passed through a 1×n beam splitter, an optical pulse with a light intensity of a maximum of nI can be produced when an address of a current node is equal to that of the optical packet header. As a result, recognizing the light intensity of an optical pulse makes it possible to determine whether the current node is a destination of the arrived optical packet. In a practically proposed structure, only one 1×n beam splitter can be used by coating the end of each optical delay line with metal to reflect an optical pulse.

The above optical CDMA method has an advantage in that a specific node need not produce a new optical signal once being assigned with a unique address, differently from the keyword method. However, the optical CDMA method is disadvantageous in that the number of produced addresses is very small as compared with the length of a header for securing orthogonality. Namely, the number of expressible addresses is smaller than $(N-1)/\{n(n-1)\}$ in an orthogonal optical code (OOC) where the intensity of light outputted as a result of the header processing for address retrieval is nI when two addresses to be compared are equal and I in other cases.

As mentioned above, the optical packet switch must process the optical packet header as rapidly as possible within a given time. For this reason, the optical process is preferable to the electric process. However, optical processing methods proposed up to the present are very complex in construction (like the keyword method) or significantly limited in the number of expressible addresses (like the optical CDMA method).

SUMMARY OF THE INVENTION

Therefore, the present invention has been made in view of the above problems, and it is an object of the present invention to provide an optical packet header processing apparatus for an optical packet switch which is simple in construction and can express a large number of addresses.

It is another object of the present invention to provide an optical packet header processing apparatus for an optical packet switch which is more advantageous in long-distance transmission than a conventional method based on a wavelength or light intensity in that it produces and processes a header in a time domain and which is simpler than a conventional keyword method and can accommodate a larger number of addresses in a header of the same length than those in a conventional optical CDMA method.

It is yet another object of the present invention to provide an optical packet header processing apparatus for an optical packet switch which is capable of generating the amount of information of one to several bits.

In accordance with one aspect of the present invention, the above and other objects can be accomplished by a provision of an optical packet header processing apparatus for processing a header of an optical packet expressing an address of a destination node to control a switching operation of an optical packet switch, comprising a first beam splitter for splitting the optical packet header into a predetermined number of optical packet header elements; a plurality of time interval detectors, each of the time interval detectors receiving a corresponding one of the optical packet header elements from the first beam splitter and outputting a detect optical pulse if a pair of optical pulses having a predetermined time interval therebetween are present in the received optical packet header element; and a plurality of optical pulse detectors for converting the detect optical pulses from the time interval detectors into electrical signals and transferring the converted electrical signals to the optical packet switch, respectively; whereby the optical packet switch determines the destination node in response to the electrical signals from the optical pulse detectors and outputs the optical packet to an output port corresponding to the determined destination node.

Preferably, the optical packet header has a total length of N bits and includes n(<N) optical pulses, the optical packet header expressing the destination node as a combination of n−1 optical pulses, and the first beam splitter is adapted to split the optical packet header into at least N−1 optical packet header elements.

Preferably, each of the time interval detectors includes a second beam splitter for splitting the corresponding optical packet header element from the first beam splitter into the pair of optical pulses; a direct line for passing one optical pulse of the optical pulse pair with no delay; a time delay line for delaying the other optical pulse of the optical pulse pair for a predetermined period of time; and an optical AND gate for outputting the detect optical pulse upon receiving the optical pulses from the direct line and time delay line at the same time.

In accordance with another aspect of the present invention, there is provided an optical packet header processing apparatus for processing a header of an optical packet expressing an address of a destination node to control a switching operation of an optical packet switch, comprising a first beam splitter for splitting the optical packet header into a predetermined number of optical packet header elements; a plurality of time interval detectors, each of the time interval detectors receiving a corresponding one of the optical packet header elements from the first beam splitter and outputting a first detect optical pulse if a pair of optical pulses having a predetermined time interval therebetween are present in the received optical packet header element; a first optical AND gate for performing an AND operation for the first detect optical pulses from the time interval detectors and outputting at least one second detect optical pulse as a result of the AND operation; and an optical pulse detector for converting the second detect optical pulse from the first optical AND gate into an electrical signal and transferring the converted electrical signal to the optical packet switch; whereby the optical packet switch drops the optical packet in response to the presence of the electrical signal from the optical pulse detector and passes it in response to the presence of no electrical signal from the optical pulse detector.

Preferably, the optical packet header has a total length of N bits and includes n(<N) optical pulses, the optical packet header expressing the destination node as a combination of n−1 optical pulses, and the first beam splitter is adapted to split the optical packet header into at least N−1 optical packet header elements.

Preferably, each of the time interval detectors includes a second beam splitter for splitting the corresponding optical packet header element from the first beam splitter into the pair of optical pulses; a direct line for passing one optical pulse of the optical pulse pair with no delay; a time delay line for delaying the other optical pulse of the optical pulse pair for a predetermined period of time; and a second optical AND gate for outputting the first detect optical pulse upon receiving the optical pulses from the direct line and time delay line at the same time.

In accordance with yet another aspect of the present invention, there is provided an optical packet header processing apparatus for processing a header of an optical packet expressing an address of a destination node to control a switching operation of an optical packet switch, comprising a beam splitter for splitting the optical packet header into a predetermined number of optical packet header elements; a plurality of time interval discriminators, each of the time interval discriminators receiving a corresponding one of the optical packet header elements from the beam splitter and outputting a discrimination signal if a pair of optical pulses having a predetermined time interval therebetween are present in the received optical packet header element; and a controller for determining the destination node in response to the discrimination signals from the time interval discriminators and transferring the optical packet to the determined destination node.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE INVENTION

According to the present invention, an inter-optical pulse time interval detector is used to process an optical packet header. An optical packet used herein is modulated in a return to zero (RZ) manner similarly to optical packets in other optical switches. Also, such an optical packet is composed of an optical packet header and a payload.

Figure 6:
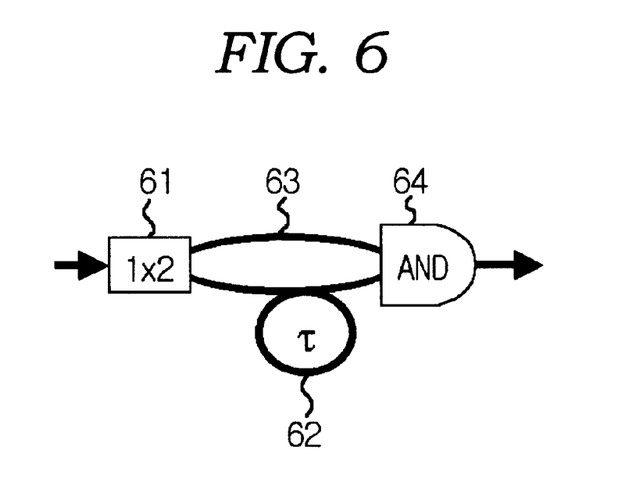
FIG. 6 is a view showing the construction of an inter-optical pulse time interval detector which is applied to the present invention.

First, a description will be given of the construction and operation of the inter-optical pulse time interval detector with reference to FIG. 6.

Upon receiving an optical signal with a set of optical pulses timely arranged, a 50:50 1×2 beam splitter 61 in the inter-optical pulse time interval detector splits the received optical signal into two optical signals of the same light intensities. The first optical signal from the 1×2 beam splitter 61 is transferred to one input terminal of an optical AND gate 64 along a direct line 63, and the second optical signal from the 1×2 beam splitter 61 is delayed on a time delay line 62 by from the first optical signal and then arrives at the other input terminal of the optical AND gate 64. Noticeably, two optical pulses of the original optical signal can be simultaneously incident on the two input terminals of the optical AND gate 64 only when they have a time interval of therebetween. The optical AND gate 64 outputs one optical pulse only when it receives optical pulses simultaneously at its two input terminals. As a result, the inter-optical pulse time interval detector provides an output optical pulse when optical pulses of an input optical signal have the time interval of therebetween.

The above optical AND gate can be constructed in various ways. For example, the optical AND gate may be constructed in a four wave mixing manner using a semiconductor optical amplifier (SOA). Alternatively, the optical AND gate may employ a structure such as a modified terahertz optical asymmetric demultiplexer (TOAD) with an SOA installed in an optical fiber loop mirror.

For processing an optical packet header in an optical manner, the 1×2 beam splitter is used to radiate an input optical packet and separate a header therefrom. The optical packet header can be separated from the packet in various ways. For example, the payload and header may be separated from each other by wavelength filters with different wavelengths or a method based on polarization or light intensity. Alternatively, the optical header may be separated from the optical packet by a method based on a time interval of 1.5 in a time domain. In this method, each bit of the header is expressed by a pair of optical pulses having an interval of 1.5 times a payload bit period (a reciprocal of a bit rate) therebetween, and a beam delay time of the inter-optical pulse time interval detector is set to 1.5. Under these conditions, the optical header can be separated from the optical packet it by extracting one optical pulse from each pair of optical pulses.

Now, a description will be made of the preferred embodiments of the present invention on the assumption that the optical header is separated from the optical packet.

Figure 7:
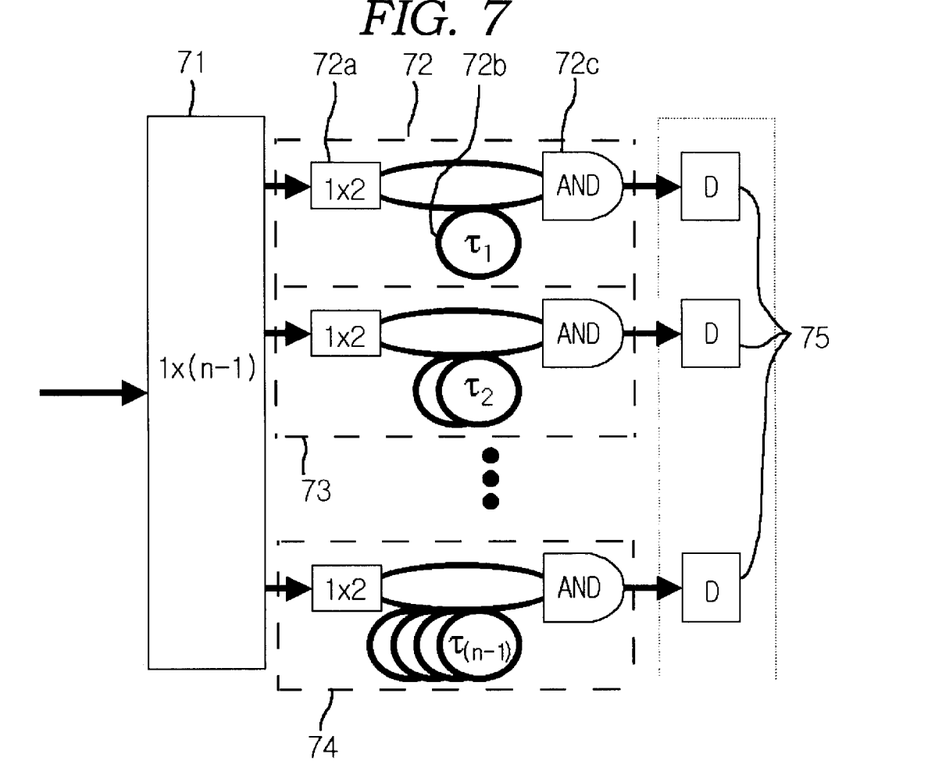
FIG. 7 is a view showing the construction of an optical packet header processing apparatus for an optical packet switch in accordance with an embodiment of the present invention.

FIG. 7 is a view showing the construction of an optical packet header processing apparatus for an optical packet switch in accordance with an embodiment of the present invention. It should be noted that the total N optical pulses can be present in the optical packet header if an optical pulse bit period of the optical packet header is and the total length of the header is N. FIG. 7 shows the case where n(<N) optical pulses are present in the optical packet header. The optical packet header expresses a node address as a positional combination of n−1 optical pulses, which will hereinafter be mentioned in detail.

The optical packet header contains information about an address of a destination node. This address information of the destination node is expressed by a combination of several optical pulses with a given time interval from a reference optical pulse in a time domain.

In FIG. 7, the optical packet header processing apparatus is shown to process a node address expressed by the above optical pulse combination. The optical packet header processing apparatus comprises a 1×(n−1) beam splitter 71 for splitting one optical packet header into n−1 optical packet headers, $_1$ to $_{(n-1)}$ time interval detectors 72–74 for receiving the n−1 optical packet headers from the 1×(n−1) beam splitter 71, respectively, and n−1 optical pulse detectors 75 for detecting optical pulses from the $_1$ to $_{(n-1)}$ time interval detectors 72–74 and converting them into electrical signals, respectively.

The 1×(n−1) beam splitter 71 is adapted to split an input optical packet header into n−1 optical packet headers and distribute the split n−1 optical packet headers respectively to the n−1 time interval detectors 72–74. The $_1$ time interval detector 72 is adapted to detect a time interval of $_1$ between optical pulses. Namely, upon receiving the corresponding optical packet header from the 1×(n−1) beam splitter 71, a beam splitter 72a in the $_1$ time interval detector 72 splits it into two optical pulses and transfers the split optical pulses to an AND gate 72d. At this time, the split optical pulses from the beam splitter 72a are passed along a direct line 72b and a $_1$ time delay line 72c, respectively. The optical pulse on the time delay line 72c is delayed by $_1$ from the optical pulse on the direct line 72b and then arrives at the AND gate 72d. As a result, the AND gate 72d receives a reference optical pulse from the time delay line 72c at a time interval of $_1$ after receiving a bit from the direct line 72b. The AND gate 72d is adapted to output one optical pulse to the corresponding optical pulse detector 75 upon receiving optical pulses at its both input terminals. The corresponding optical pulse detector 75 detects the output optical pulse from the AND gate 72d and converts it into an electrical signal, which is then applied to an optical switch, not shown. The optical switch detects a destination address of the optical packet from the electrical signals from the optical pulse detectors 75.

Each node address is expressed by a combination of time intervals between optical pulses, which are n−1 in number in an optical packet header. As a result, the nodes can detect optical packet headers with the same destination addresses as their self addresses, respectively, by setting the time intervals $_1$ to $_{(n-1)}$ of the time interval detectors 72–74 differently according to the self addresses.

Figure 8:
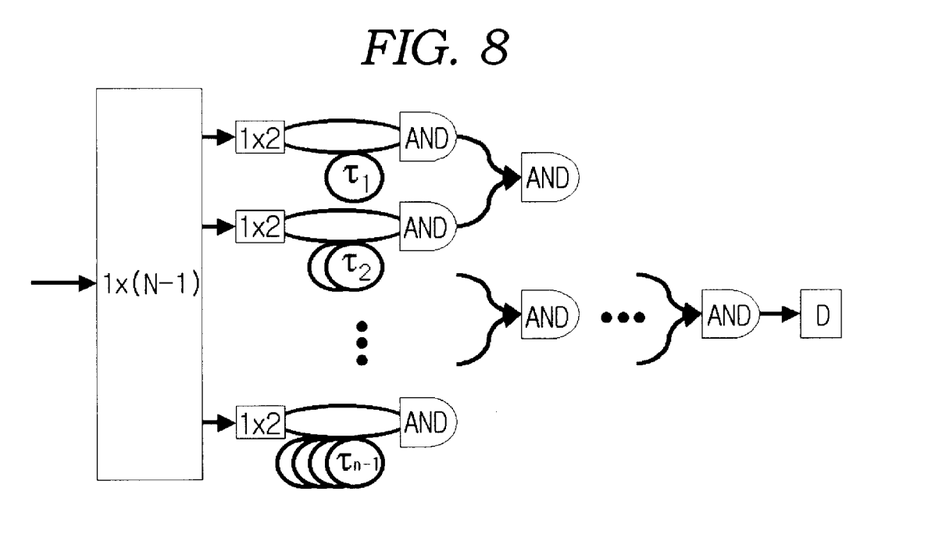
FIG. 8 is a view showing the construction of an optical packet header processing apparatus for an optical packet switch in accordance with an alternative embodiment of the present invention.

FIG. 8 is a view showing the construction of an optical packet header processing apparatus for an optical packet switch in accordance with an alternative embodiment of the present invention. As shown in this drawing, the optical packet header processing apparatus comprises a 1×(n−1) beam splitter 81 for splitting one optical packet header into n−1 optical packet headers, and n−1 time interval detectors 82, each for detecting whether optical pulses having a specific time interval therebetween are present in a corresponding one of the n−1 optical packet headers from the 1×(n−1) beam splitter 81 and outputting a detect optical pulse in accordance with the detected result. A plurality of optical AND gates 83 are connected in series or parallel to perform an AND operation for the detect optical pulses from the n−1 time interval detectors 82. An optical detector 84 is adapted to convert one optical pulse from the last one of the optical AND gates 83 into a binary electrical signal and transfer the converted binary electrical signal to an optical switch. This optical switch drops the optical packet on a current node or passes it to the next node according to a high or low level of the binary electrical signal from the optical detector 84.

Alternatively, one multi-input AND gate with a plurality of inputs and one output may be used instead of the optical AND gates 83.

The optical packet header processing apparatus shown in FIG. 8 can obtain information about whether an address stored in an input optical packet header is equal to that of a current node, as a binary one bit signal, in a similar manner to the conventional keyword method or optical fiber delay line matched filter.

Alternatively, the optical packet header processing apparatus shown in FIG. 8 may obtain an electrical signal of more than one bit through a proper combination of the AND gates.

In practice, the inter-optical pulse time interval detector detects only a time interval between optical pulses regardless of their positions in the header. For this reason, it is not necessary for the inter-optical pulse time interval detector to output a detect optical pulse, if it has a time delay line adjusted to a specific value. As a result, the number of different addresses is smaller than $_{N-1}C_{n-1}$. But, a much larger number of addresses can be obtained than those in the conventional optical CDMA method with respect to the same optical header length and the same number of optical pulses.

Figure 9:
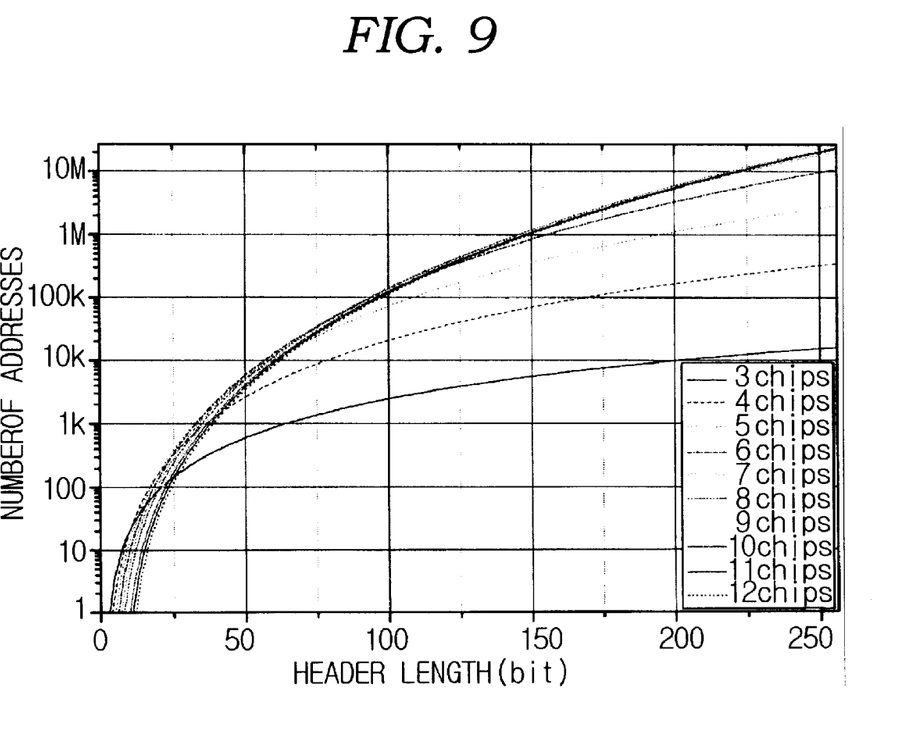
FIG. 9 is a graph showing the number of addresses expressible with respect to a header length and the number of optical pulses in accordance with the present invention.

FIG. 9 is a graph showing the number of addresses expressible with respect to a header length and the number of optical pulses in accordance with the present invention, under the condition that n optical pulses are present in the header and n−1 interoptical pulse time interval detectors have different time delay lines to express a destination address, as shown in FIG. 8.

In another embodiment of the present invention, an optical packet header processing apparatus for an optical packet switch comprises a beam splitter for splitting one optical packet header into a predetermined number of optical packet headers, a plurality of time interval discriminators, each for discriminating whether optical pulses having a predetermined time interval therebetween are present in a corresponding one of the optical packet headers from the beam splitter and outputting a discrimination signal in accordance with the discriminated result, and a controller for determining a destination node of the optical packet in response to the discrimination signals from the time interval discriminators and transferring the optical packet to the determined destination node.

The above beam splitter and time interval discriminators are operated in the same or similar manner to those in the first and second embodiments. The controller is adapted to determine a destination node of the optical packet in response to the discrimination signals from the time interval discriminators and switch the optical packet to the determined destination node.

As apparent from the above description, according to the present invention, the optical packet header processing apparatus for the optical packet switch is simple in construction, and can express a large number of addresses and read the amount of information of one to several bits. Therefore, the present invention has the effect of making it possible to perform a more complex switching operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What we claim:

1. An optical packet header processing apparatus for processing a header of an optical packet expressing an address of a destination node to control a switching operation of an optical packet switch, comprising:

a first beam splitter for splitting said optical packet header into a predetermined number of optical packet header elements;

a plurality of time interval detectors, each of said time interval detectors receiving a corresponding one of said optical packet header elements from said first beam splitter and outputting a detect optical pulse if a pair of optical pulses having a predetermined time interval therebetween are present in the received optical packet header element; and a plurality of optical pulse detectors for converting said detect optical pulses from said time interval detectors into electrical signals and transferring the converted electrical signals to said optical packet switch, respectively;

whereby said optical packet switch determines said destination node in response to said electrical signals from said optical pulse detectors and outputs said optical packet to an output port corresponding to the determined destination node.

2. The optical packet header processing apparatus of claim 1, wherein said optical packet header has a total length of N bits and includes n(<N) optical pulses, said optical packet header expressing said destination node as a combination of n−1 optical pulses.

3. The optical packet header processing apparatus of claim 2, wherein said first beam splitter is adapted to split said optical packet header into at least N−1 optical packet header elements.

4. The optical packet header processing apparatus of claim 1, wherein each of said time interval detectors includes:

a second beam splitter for splitting said corresponding optical packet header element from said first beam splitter into said pair of optical pulses;

a direct line for passing one optical pulse of said optical pulse pair with no delay;

a time delay line for delaying the other optical pulse of said optical pulse pair for a predetermined period of time; and an optical AND gate for outputting said detect optical pulse upon receiving said optical pulses from said direct line and time delay line at the same time.

5. An optical packet header processing apparatus for processing a header of an optical packet expressing an address of a destination node to control a switching operation of an optical packet switch, comprising:

a first beam splitter for splitting said optical packet header into a predetermined number of optical packet header elements;

a plurality of time interval detectors, each of said time interval detectors receiving a corresponding one of said optical packet header elements from said first beam splitter and outputting a first detect optical pulse if a pair of optical pulses having a predetermined time interval therebetween are present in the received optical packet header element;

a first optical AND gate for performing an AND operation for said first detect optical pulses from said time interval detectors and outputting at least one second detect optical pulse as a result of the AND operation; and an optical pulse detector for converting said second detect optical pulse from said first optical AND gate into an electrical signal and transferring the converted electrical signal to said optical packet switch;

whereby said optical packet switch drops said optical packet in response to the presence of said electrical signal from said optical pulse detector and passes it in response to the presence of no electrical signal from said optical pulse detector.

6. The optical packet header processing apparatus of claim 5, wherein said optical packet header has a total length of N bits and includes n(<N) optical pulses, said optical packet header expressing said destination node as a combination of n−1 optical pulses.

7. The optical packet header processing apparatus of claim 6, wherein said first beam splitter is adapted to split said optical packet header into at least N−1 optical packet header elements.

8. The optical packet header processing apparatus of claim 5, wherein each of said time interval detectors includes:

a second beam splitter for splitting said corresponding optical packet header element from said first beam splitter into said pair of optical pulses;

a direct line for passing one optical pulse of said optical pulse pair with no delay;

a time delay line for delaying the other optical pulse of said optical pulse pair for a predetermined period of time; and a second optical AND gate for outputting said first detect optical pulse upon receiving said optical pulses from said direct line and time delay line at the same time.

9. An optical packet header processing apparatus for processing a header of an optical packet expressing an address of a destination node to control a switching operation of an optical packet switch, comprising:

a beam splitter for splitting said optical packet header into a predetermined number of optical packet header elements;

a plurality of time interval discriminators, each of said time interval discriminators receiving a corresponding one of said optical packet header elements from said beam splitter and outputting a discrimination signal if a pair of optical pulses having a predetermined time interval therebetween are present in the received optical packet header element; and a controller for determining said destination node in response to said discrimination signals from said time interval discriminators and transferring said optical packet to the determined destination node.

* * * * *